United States Patent [19]
Walker

[11] Patent Number: 6,021,652
[45] Date of Patent: Feb. 8, 2000

[54] FLOW-CONTROL VALVE WITH VALVE MEMBER POSITION SENSOR

[75] Inventor: James M. Walker, Fond du Lac, Wis.

[73] Assignee: Alliance Laundry Systems LLC, Ripon, Wis.

[21] Appl. No.: 09/115,282

[22] Filed: Jul. 14, 1998

[51] Int. Cl.[7] .............................. D06F 43/00; F17D 3/00
[52] U.S. Cl. ............................................ 68/207; 137/554
[58] Field of Search ...................... 137/554; 251/129.04; 68/207, 18 R

[56] References Cited

U.S. PATENT DOCUMENTS

| | | | |
|---|---|---|---|
| 4,926,903 | 5/1990 | Kawai ...................................... | 137/554 |
| 5,027,853 | 7/1991 | Walko et al. ........................... | 137/554 |
| 5,098,063 | 3/1992 | Ronzon ................................... | 137/554 |
| 5,099,867 | 3/1992 | Emery ................................. | 137/554 X |
| 5,159,949 | 11/1992 | Prescott et al. ................ | 251/129.04 X |
| 5,564,470 | 10/1996 | Denmark et al. ........................ | 137/554 |
| 5,822,818 | 10/1998 | Chao et al. ............................. | 68/18 R |

*Primary Examiner*—Philip R. Coe
*Attorney, Agent, or Firm*—Leydig, Voit & Mayer, Ltd.

[57] ABSTRACT

A valve member position sensor for continuously monitoring the position of the valve member of a flow-control valve in a dry-cleaning apparatus using $CO_2$ as the cleaning fluid. The valve member position sensor includes a potentiometer with its shaft connected to the drive shaft of the valve such the resistance of the potentiometer changes with the valve member position. The resistance value of the potentiometer is detected by passing a constant current through the potentiometer to produce a voltage drop across the potentiometer. The voltage drop is measured by a controller to determine the valve position.

18 Claims, 3 Drawing Sheets ns" 6,021,652

FLOW-CONTROL VALVE WITH VALVE MEMBER POSITION SENSOR

FIELD OF THE INVENTION

The present invention relates generally to flow-control valves, and, more particularly, to a system for detecting and monitoring the position or degree of opening of the movable valve member of a flow-control valve, such as required in liquid carbon dioxide ($CO_2$) dry-cleaning systems.

BACKGROUND OF THE INVENTION

Known dry-cleaning processes consist of wash, rinse, and drying cycles with solvent recovery. Garments are loaded into a basket in a cleaning drum and immersed in a dry-cleaning fluid or solvent, which is pumped into the cleaning drum from a storage tank. Conventional dry-cleaning solvents include perchloroethylene (PCE), petroleum-based or Stoddard solvents, CFC-113, and 1,1,1-trichloroethane, all of which are generally aided by a detergent. The dry-cleaning solvent is used to dissolve soluble contaminants, such as oils, and to entrain and wash away insoluble contaminants, such as dirt.

The use of these conventional dry-cleaning solvents poses a number of health and safety risks. At least one of these solvents, PCE, is a suspected carcinogen. Moreover, halogenated solvents are known to be environmentally unfriendly. To avoid these problems associated with the conventional solvents, dry-cleaning systems which utilize dense phase fluids, such as liquid carbon dioxide ($CO_2$), as a cleaning fluid have been developed. A dry-cleaning apparatus and method employing liquid $CO_2$ as the dry-cleaning fluid is disclosed in U.S. Pat. No. 5,467,492 entitled "Dry-Cleaning Garments Using Liquid Carbon Dioxide Under Agitation As Cleaning Medium." A similar dry-cleaning apparatus is disclosed in U.S. Pat. No. 5,651,276.

In these dry-cleaning systems, the $CO_2$ liquid used as the cleaning fluid is typically stored in a storage tank. During operation, the liquid $CO_2$ is pumped into a cleaning vessel in which the soiled garments are washed and rinsed. After the washing operation, the now contaminated liquid $CO_2$ is pumped from the cleaning vessel to a solvent recovery device where the contaminants are removed from the $CO_2$ by, for example, vaporizing the $CO_2$. The gaseous $CO_2$ is then reliquidized in a condenser and returned to the storage tank.

To control the flow of the liquid and gaseous $CO_2$ between the operating components of the dry-cleaning system, a plurality of flow-control valves are used in the dry-cleaning system. To ensure the proper operation of the dry-cleaning system, the opening and closing of the valves in the system must be well controlled and monitored. For example, friction or other factors may prevent the valve member of a valve from being moved into a fully-open or fully-closed position. To identify such problem, the position of the valve member has to be detected with sufficient precision to enable an accurate determination of the valve member position. Moreover, in the cleaning operation, a valve may have to be opened or closed gradually to achieve a smooth flow of the liquid or gaseous $CO_2$. To that end, it is necessary to detect not only the open and closed positions of the valve member but also its intermediate positions between the open and closed positions.

Conventional valve member position sensors incorporate proximity switches or single-pole switches to determine whether a valve is open or closed. Such sensors are generally not suitable for the flow-control application in liquid $CO_2$ dry-cleaning systems because they do not provide a sufficiently precise reading of the valve member position to enable a distinction between a fully-open position and a nearly fully-open position. Moreover, due to the discrete nature of their position detection, such sensors can only generally indicate whether the valve member of a valve is in either its open or closed position, but not any intermediate position.

Since there are multiple flow-control valves used in liquid $CO_2$ dry cleaning systems, cost considerations further dictate that the valve member position sensors be relatively inexpensive. The valve member position sensors also must be easy to install, operate, and maintain.

SUMMARY OF THE INVENTION

It is an object of the invention to provide a flow-control valve having a valve member position sensor that accurately determines and monitors the position and/or degree of opening of the movable valve member of the valve.

Another object is to provide a flow-control valve member position sensor as characterized above that is relatively simple in construction and lends itself to economical manufacture.

A further object is to provide a flow-control valve member position sensor of the above kind that is easy to install and is simple and reliable in operations.

These and other objects and advantages of the invention will be more readily apparent upon reading the following detailed description of a preferred exemplary embodiment of the invention and upon reference to the accompanying drawings in which:

Figure 1:
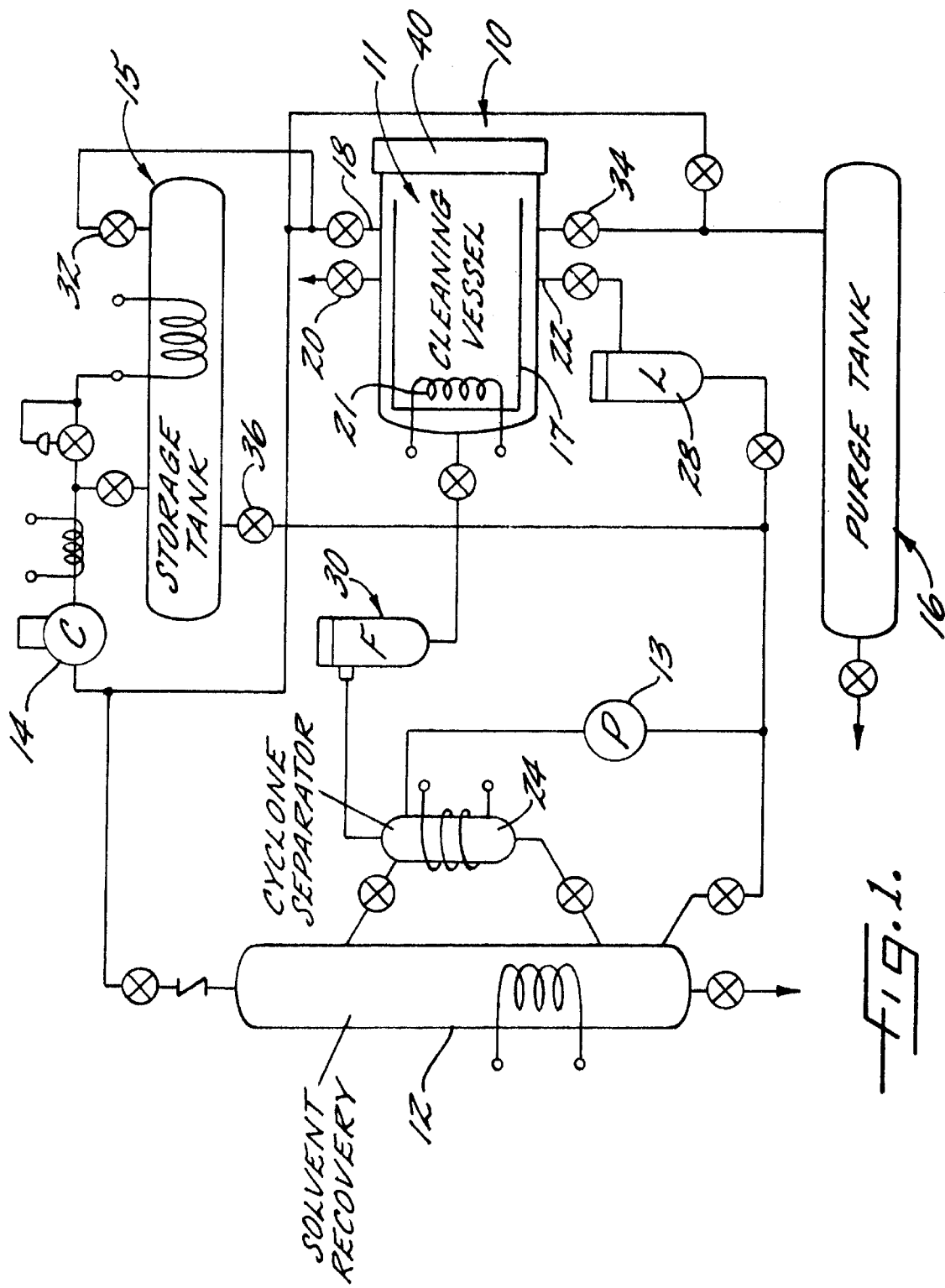
FIG. 1 is a schematic of an illustrative liquid carbon dioxide ($CO_2$) dry-cleaning system having flow-control valves equipped with valve member position sensors in accordance with the present invention.

While the invention is susceptible of various modifications and alternative constructions, a certain illustrated embodiment hereof has been shown in the drawings and will be described below. It should be understood, however, that there is no intention to limit the invention to the specific form disclosed, but, on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now more particularly to FIG. 1 of the drawings, there is shown an illustrative dry-cleaning apparatus 10 which employs a plurality of flow-control valves and includes valve member position sensors in accordance with the invention for monitoring the operating positions of selected valves. The illustrated dry-cleaning apparatus 10 is of a type that utilizes liquid carbon dioxide ($CO_2$) as a dry-cleaning fluid or solvent, such as the dry-cleaning system disclosed in U.S. application Ser. No. 08/998,394, assigned to the same assignee as the present application, the disclosure of which is incorporated herein by reference. The dry-cleaning apparatus 10 basically includes a cleaning vessel 11, a solvent recovery device 12, a pump 13, a compressor 14, a liquid $CO_2$ storage tank 15, and a purge tank 16, all of which may be of a conventional type.

Briefly, the liquid $CO_2$ used in the dry-cleaning process is stored in the storage tank 15. Soiled garments or other items to be cleaned are deposited in a perforated rotatable basket 17 supported in the cleaning vessel 11. To begin the dry-cleaning process, the cleaning vessel 11 is charged with liquid $CO_2$ from the storage tank 15. After the wash and rinse cycles are completed, the now contaminated liquid $CO_2$ is drained from the cleaning vessel 11 to the solvent recovery device 12 which functions to vaporize the liquid $CO_2$ to remove the contaminants. The vaporized $CO_2$ is then reliquidized by a condenser (not shown) and returned to the storage tank 15. The pump 13 is used to transfer liquid $CO_2$ between the components of the dry-cleaning apparatus, including the storage tank 15, the solvent recovery device 12, and the cleaning vessel 11. The compressor 14 is provided to pump gaseous $CO_2$ from the cleaning vessel 11 to a condenser (not shown) where it is condensed back into the liquid form and then returned to the storage tank 15. To control the pressure and temperature within the cleaning vessel 11, $CO_2$ may be quickly discharged from the cleaning vessel 11 to the purge tank 16. The cleaning operation is controlled and monitored by a controller 50 (FIG. 2) which has a control panel 52 for accepting user instructions and displaying information regarding various aspects of the dry-cleaning apparatus, including, for example, the various degrees of opening of the control-flow valves in the system.

In this dry-cleaning apparatus 10, multiple flow-control valves are used to control the flow of $CO_2$ liquid or gas during the operation of the cleaning apparatus. Such valves include, for example, the valve 18 between the storage tank 15 and the cleaning vessel 11 and the valve 22 between the cleaning vessel and the solvent recovery device 12. After soiled garments to be cleaned are loaded in cleaning vessel 11, the valve 18 is opened to allow liquid $CO_2$ from the storage tank 15 to flow into the cleaning vessel 11. After the wash and rinse cycles are completed, the valve 22 is opened to allow the contaminated liquid $CO_2$ to flow from the cleaning vessel 11 to the solvent recovery device 12.

Figure 2:
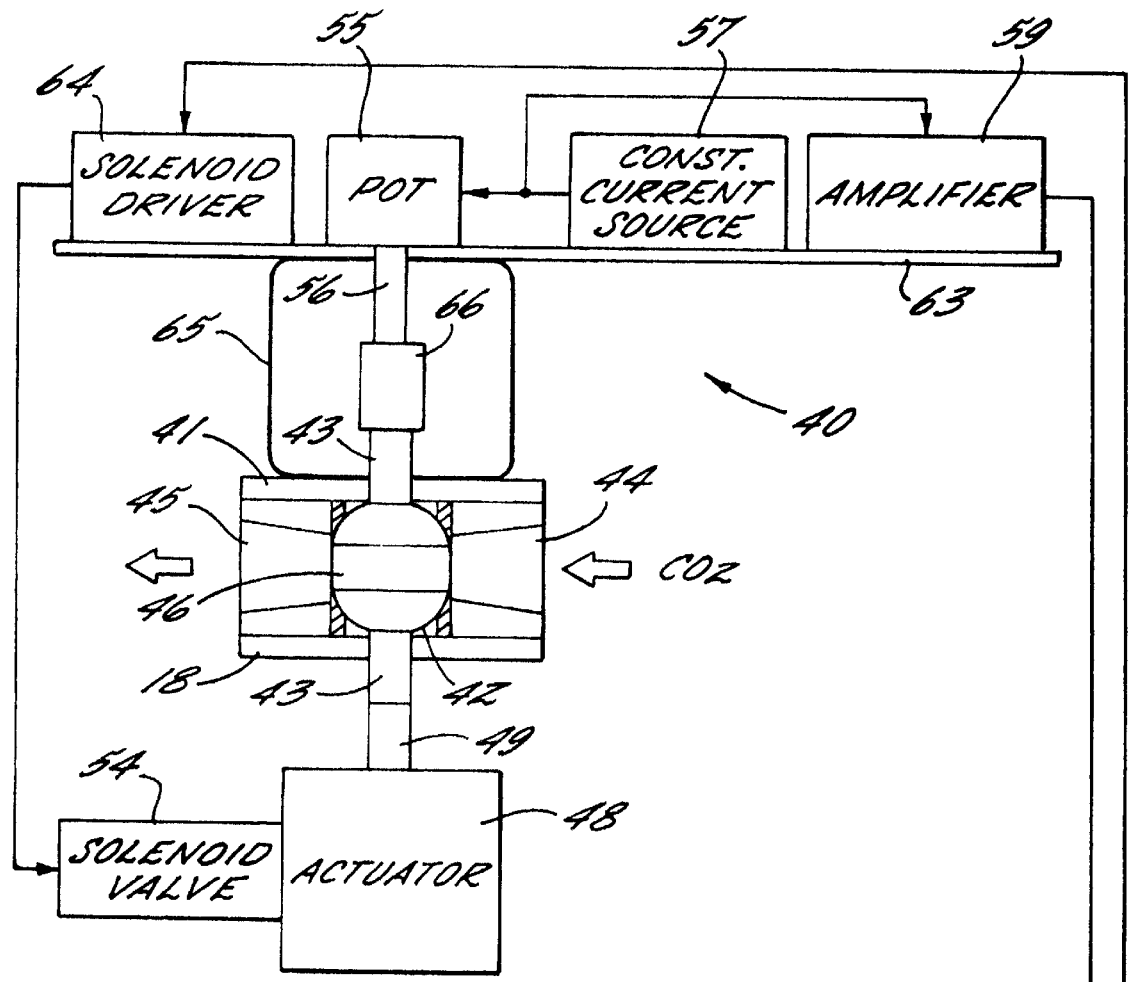
FIG. 2 is a schematic diagram of one of the flow-control valves and an associated valve member position sensor in accordance with the invention.
Figure 2:
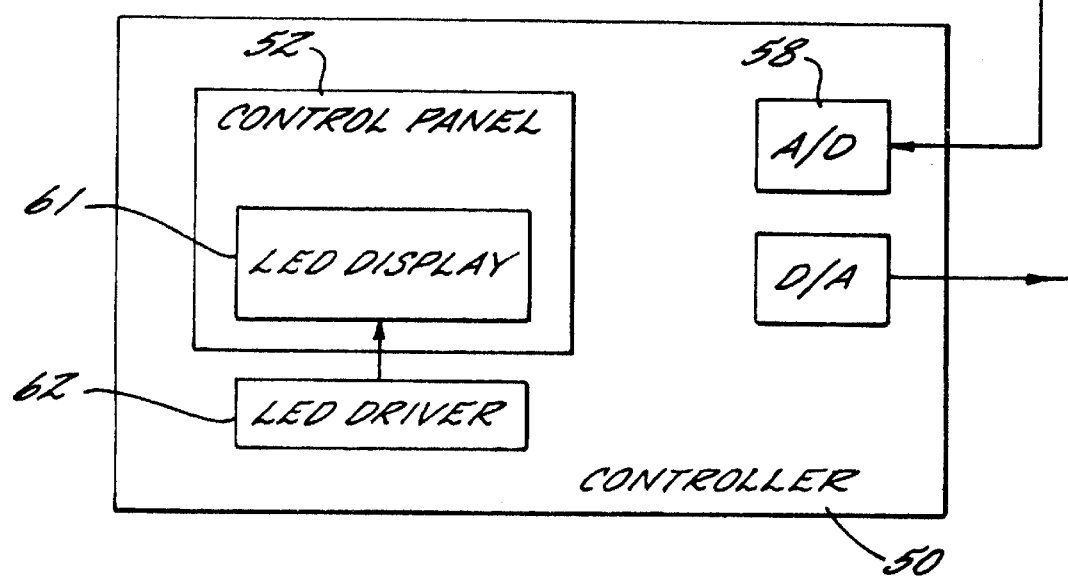

The illustrated valve 18, as shown in FIG. 2, includes a housing 41, a movable valve member 42 enclosed in the housing, and a valve drive shaft 43 for moving the valve member into open and closed positions. In the illustrated embodiment, the valve 18 is a conventional ball valve with a rotatable ball member as the movable valve member 42, and the drive shaft 43 is in the form of a stem connected to the ball member. The valve 18 includes an inlet port 44 and an outlet port 45 which are provided with respective connectors, such as NPT fittings or other types of fittings, for connection with an inlet line and an outlet line (not shown). The ball member 42 has an aperture 46 formed therethrough which serves as a passage for a fluid to flow between the inlet port 44 and the outlet port 46. When the ball member 42 is rotated into an open position as illustrated in FIG. 2, the aperture 46 in the ball member is aligned with the inlet port 44 and the outlet port 45 to allow the fluid to flow through the valve. When the ball member is rotated into a closed position where the aperture 46 is perpendicular to the inlet and outlet ports, the flow is blocked by the ball member and the valve is closed.

To operate the valve drive shaft 43 to open and close the valve 18, a pneumatic actuator 48 is provided. The actuator 48, which also may be of a conventional type, includes a shaft 49 which is coupled to appropriate pistons in the actuator in a rack-and-pinion arrangement. The shaft 49 of the actuator 48 is connected to the drive shaft 43 of the valve 18. A solenoid valve 54 controls the flow of compressed air into the actuator 48. When the solenoid valve 54 is opened by energizing a solenoid thereof by a solenoid driver 64, compressed air flowing into the actuator 48 moves the pistons in the actuator. The pistons in turn rotate the shaft 49 of the actuator and the drive shaft 43 of the valve 18 to move the valve member 42 to its open position. In the preferred embodiment, the pistons of the actuator 48 are provided with return springs for moving the valve member back to its closed position. Alternatively, a double-action actuator that requires the inflow of compressed air for both opening and closing the valve may be used to operate the valve 18.

To ensure the proper operation of the dry-cleaning system, the opening and closing of the flow-control valves in the system must be well controlled and monitored. For example, friction may prevent the valve member of a valve from reaching its fully-open position. An incomplete opening may cause cavitation (i.e., generation of bubbles) in the liquid $CO_2$ flowing therethrough, which tends to reduce the service life of the pump 13 (FIG. 1). Furthermore, for some valves in the system, it is necessary to monitor the intermediate positions of the valve member between its open and closed positions. For instance, when the valve 18 between the storage tank 15 and the cleaning vessel 11 is opened to charge the cleaning vessel with liquid $CO_2$, it is desirable to open the valve gradually to prevent the formation of strong turbulence caused by gaseous $CO_2$ rushing into the cleaning vessel. In order to monitor the gradual opening of the valve 18, it is necessary to be able to detect the intermediate positions of the ball member 40.

In accordance with the invention, a system is provided for determining and monitoring the position of the movable valve member of a flow-control valve to facilitate the efficient control and operation of the dry-cleaning apparatus. More particularly, in the illustrated embodiment, the position of the movable valve member of the flow-control valve is sensed and monitored based upon the rotational position of a valve drive shaft. To this end, referring to FIG. 2, a valve member position sensor 40 is provided that includes a potentiometer 55 connected to the valve 18 such that the resistance value of the potentiometer 55 varies in relation to the position of the valve member 42. The resistance value of the potentiometer is measured by the controller 50 which then derives a continuous valve position reading from the resistance value.

To correlate the resistance value of the potentiometer 55 to the position of the valve member 42, the shaft 56 of the potentiometer is connected to the valve drive shaft 43. When the valve drive shaft 43 is rotated by the actuator 48 to open or close the valve, the potentiometer shaft 56 is also rotated. As a result, the resistance of the potentiometer is changed in relation to the position of the valve member 42. Because the potentiometer resistance varies continuously with the valve shaft rotation, it enables an accurate detection of any intermediate position of the valve member 42.

To measure the resistance of the potentiometer 55 for determining the position of the valve member 42, a constant current generated by a constant current source 57 is passed through the potentiometer. The voltage drop across the potentiometer 55 is then measured. Since the current is held constant, the voltage drop is directly proportional to the potentiometer resistance. The voltage drop is amplified by an amplifier 59. The amplified voltage from the amplifier 59 is then converted by an analog-to-digital (A/D) converter 58 into a digital number which is processed by the controller 50 to derive the valve member position.

For enabling the operator of the dry-cleaning apparatus to monitor the valve position, in the preferred embodiment the determined valve position (in terms of degrees of shaft rotation or percentage of the total opening, etc.) is displayed on a display device. The display device may be, for example, an LED display 61 driven by a driver 62 under the control of the controller 50. Alternatively, analog meters may be used for the display.

In order to simplify the construction of the valve member position sensor 40 and to save space and cost, in the illustrated embodiment the potentiometer 55 is mounted on a printed circuit board 63 which also contains a valve position sensing circuit and the driver circuit 64 for the solenoid valve 54. The printed circuit board 63 is mounted directly on the housing 41 of the valve 18 by a bracket 65 or the like. The shaft 56 of the potentiometer 55 is connected to the valve drive shaft 43 by a coupler 66. The illustrated coupler 66, as shown in FIG. 2, is a hollow metal cylinder with an inner diameter dimensioned to receive the ends of the valve drive shaft 43 and the potentiometer shaft 56 and with set screws for securing the coupler to the shafts.

Figure 3:
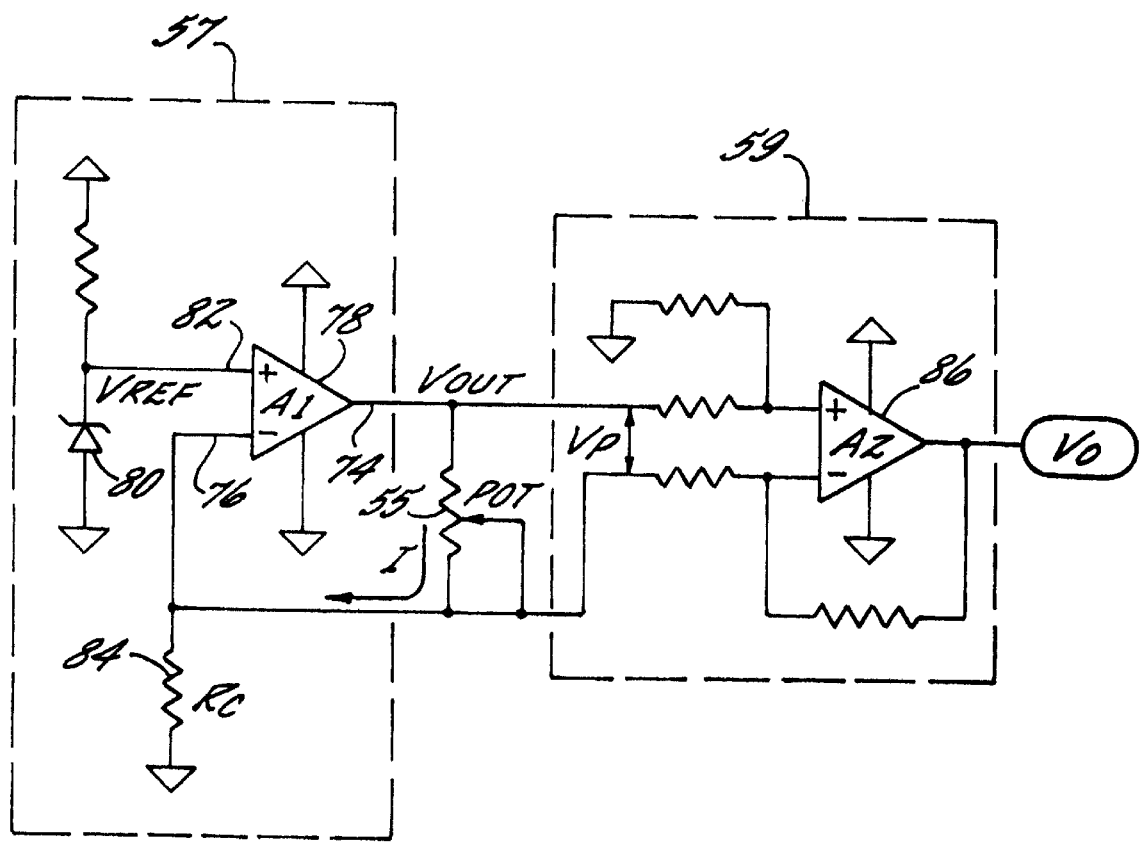
FIG. 3 is a schematic diagram showing an electronic circuit for the illustrated valve member position sensor.

The valve position sensing circuit on the printed circuit board 63, as illustrated in FIG. 3, includes both the constant current source 57 and the voltage amplifier 59 shown in FIG. 2. The constant current source 57 includes a differential amplifier 78, a zener diode 80, and a resistor 84. The voltage amplifier 59 includes a differential amplifier 86. The potentiometer 55 used for valve position sensing is connected between an output 74 and a negative input 76 of the differential amplifier 78. The zener diode 80 is connected to a positive input 82 of the differential amplifier 78 to provide a reference voltage $V_{REF}$. To maintain its positive and negative inputs at the same voltage, the differential amplifier 78 produces an output voltage $V_{OUT}$ that causes a constant current I to flow through the potentiometer 55 and the resistor 84 which connects the negative input 76 of the amplifier to ground. The magnitude of the constant current I is such that $I * R_C = V_{REF}$, where $R_C$ is the resistance of the resister 84. The voltage drop $V_P$ across the potentiometer 55 is accordingly $I * R_P$, where $R_P$ is the variable resistance of the potentiometer. The voltage drop $V_P$ is then amplified by the differential amplifier 86. The output voltage of the amplifier 86 is then converted by the A/D converter 60 (FIG. 2) into a digital number for processing by the controller 50.

To facilitate the derivation of the valve member position from the measured resistance of the potentiometer 55, the potentiometer preferably has a linear taper, i.e., the resistance of the potentiometer is a linear function (subject to manufacturing inaccuracies and tolerances) of the rotational position of the potentiometer shaft 43. With this arrangement, the position of the valve member 42 can be easily determined from the resistance of the potentiometer 55, and an accuracy of several degrees of rotation can be easily obtained with off-the-shelf potentiometers.

From the forgoing, it can be seen that the invention provides a valve member position sensor that utilizes a potentiometer coupled to the movable valve member of a flow-control valve to provide a continuous reading of the valve member position. By using an inexpensive potentiometer as a main component for valve position sensing, the valve member position sensor is very inexpensive and easy to construct and install. The valve member position sensor also requires very simple circuitry for its operation, while being capable of providing a continuous reading of the valve position at a reasonably high precision.

What is claimed is:

1. A valve position sensing system for detecting a degree of opening of a valve having a movable valve member, comprising:

a variable electrical resistance device coupled to said movable valve member such that the resistance of said device varies in relation to the position of the movable valve member;

a constant current source coupled to the resistance device for passing a constant current through the resistance device to produce a voltage signal indicative of the resistance value of the resistance device; and a controller operable in response to said voltage signal for determining the position of the movable valve member.

2. A valve position sensing system as in claim 1 in which the valve member is supported on a rotatable shaft, and said resistance device is connected to said valve member shaft.

3. A valve position sensing system as in claim 1 in which said variable electrical resistance device is a potentiometer.

4. A valve position sensing system as in claim 3, wherein the movable valve member is a ball member having an aperture therethrough and being connected to a valve drive shaft for rotation, and said potentiometer having a rotatable shaft connected to the valve drive shaft.

5. A valve position sensing system as in claim 3, further including a printed circuit board mounted on a housing of the valve, and said potentiometer being mounted on the printed circuit board.

6. A valve position sensing system as in claim 5, wherein the constant current source in mounted on the printed circuit board.

7. A valve position sensing system as in claim 4, wherein the resistance of the potentiometer varies substantially linearly with a rotational position of the shaft of the potentiometer.

8. A valve member position sensor for sensing a position of a valve having a housing, a movable valve member, and a valve drive shaft for moving the movable valve member into closed and open positions, comprising:

a variable electrical resistance device having a movable drive shaft for varying a resistance of the device, said resistance device drive shaft being coupled to said valve drive shaft;

a circuit board on which the resistance device is mounted, the circuit board including a constant current source for passing a constant current through the resistance device to provide a voltage signal;

a mounting member for mounting the circuit board on the housing of the valve; and a coupler for connecting the shaft of the resistance device to the valve drive shaft, whereby the resistance of the resistance device varies in relation to a position of the movable valve member.

9. A valve member position sensor as in claim 8 in which said valve drive shaft is rotatable.

10. A valve member position sensor as in claim 9 in which said electrical resistance device is a potentiometer.

11. A flow control valve comprising a housing, a movable valve member, a valve drive shaft for moving the movable valve member into closed and open flow control positions, a valve member position sensor for sensing the position of the valve member, said position sensor including a variable electrical resistance device coupled to said movable valve member such that the resistance of said device varies in relation to the position of the movable valve member, a constant current source coupled to the resistance device for passing a constant current through the resistance device to produce a voltage signal indicative of the resistance value of the resistance device; and a controller operable in response to said voltage signal for determining the position of the movable valve member.

12. A flow control valve as in claim 11 in which the valve member is supported on a rotatable shaft, and said sensing device is connected to said valve member shaft.

13. A flow control valve as in claim 11 in which said variable electrical resistance device is a potentiometer.

14. A flow control valve as in claim 13, wherein the movable valve member is a ball member having an aperture therethrough and being connected to a valve drive shaft for rotation, and said potentiometer having a rotatable shaft connected to the valve drive shaft.

15. A dry-cleaning apparatus comprising:

a storage tank for storing liquid carbon dioxide ($CO_2$) as a dry-cleaning fluid;

a cleaning vessel for washing soiled garments disposed therein, said cleaning vessel being coupled to the storage tank for receiving liquid $CO_2$ therefrom for a cleaning operation;

a valve for controlling flow of liquid $CO_2$ in the dry-cleaning apparatus, said valve having a valve member and a valve drive shaft for moving the valve member between open and closed positions;

a valve member position sensor for detecting a valve position of the valve member, said sensor including a variable electrical resistance device having a movable shaft for varying the resistance of said device, the shaft of said resistance device being connected to said valve drive shaft such that the resistance of said resistance device changes in relation to a position of the valve member;

a constant current source for passing a constant current through the resistance device to produce a voltage signal; and a controller for determining the position of the valve member according to the voltage signal from the resistance device.

16. A dry-cleaning apparatus as in claim 15, wherein the valve is a ball valve mounted on a rotatable valve drive shaft.

17. A dry-cleaning apparatus as in claim 15, further including a display device controlled by the controller to display the valve position determined by the controller.

18. A dry-cleaning apparatus as in claim 17, further including a circuit board mounted on a housing of the valve and containing the constant current source, and said resistance device being mounted on the printed circuit board.

* * * * *